United States Patent
Walker et al.

(10) Patent No.: US 6,627,816 B1
(45) Date of Patent: Sep. 30, 2003

(54) DEVICE FOR PREVENTING SWITCH OPERATION

(75) Inventors: James E. Walker, Henrietta, NY (US); Jeffrey F. Mucha, Rochester, NY (US)

(73) Assignee: Imagine That, LLC, Henrietta, NY (US)

( * ) Notice: Subject to any disclaimer, the term of this patent is extended or adjusted under 35 U.S.C. 154(b) by 0 days.

(21) Appl. No.: 10/251,185

(22) Filed: Sep. 20, 2002

(51) Int. Cl.[7] ............................. H02G 3/14; H01H 9/20
(52) U.S. Cl. ................... 174/66; 200/43.11; 200/43.16; 200/43.21; 220/241; D13/177
(58) Field of Search .................... 174/66, 67, 48, 174/49, 53, 61, 65 R; 220/3.2, 3.8, 242, 241; 200/43.19, 43.22, 43.16, 43.11, 43.21; D8/353; D13/177

(56) References Cited

U.S. PATENT DOCUMENTS

| | | | |
|---|---|---|---|
| 4,102,471 A | * 7/1978 | Lore et al. ............... 220/242 |
| D260,232 S | 8/1981 | Simons | |
| 4,347,412 A | * 8/1982 | Mihara et al. ........... 200/43.21 |
| 4,363,944 A | * 12/1982 | Poirier .................. 200/43.19 |
| 4,468,544 A | * 8/1984 | Wainess et al. .......... 200/43.16 |
| 4,506,120 A | * 3/1985 | Fleischman ............. 200/43.19 |
| 4,562,325 A | 12/1985 | De Rouen | |
| 4,590,345 A | 5/1986 | Marshell | |
| 4,733,029 A | 3/1988 | Kobayashi et al. | |
| D301,336 S | 5/1989 | Copeland | |
| D301,872 S | 6/1989 | Copeland | |
| 4,876,425 A | * 10/1989 | Woskow ................. 200/43.16 |
| 4,882,456 A | * 11/1989 | Hovanic et al. .......... 200/43.19 |
| 4,978,816 A | 12/1990 | Castonguay et al. | |
| D314,556 S | * 2/1991 | Aggson .................... D13/173 |
| 5,009,610 A | * 4/1991 | Woskow ..................... 174/67 |
| 5,077,452 A | 12/1991 | Mathers et al. | |
| 5,148,910 A | 9/1992 | Williams | |
| 5,212,347 A | 5/1993 | Powers et al. | |
| 5,225,963 A | 7/1993 | Smart | |
| 5,260,528 A | * 11/1993 | Benda ................... 200/43.22 |
| 5,324,897 A | * 6/1994 | Melgoza et al. ......... 200/43.19 |
| 5,331,122 A | * 7/1994 | Winder ................... 200/43.19 |
| D351,376 S | * 10/1994 | Hughes .................... D13/177 |
| 5,434,378 A | 7/1995 | McLean | |
| D372,224 S | * 7/1996 | Larned et al. ............ D13/173 |
| 5,543,593 A | * 8/1996 | Turek ..................... 200/43.11 |
| 5,577,602 A | * 11/1996 | Conner et al. .............. 174/66 |
| 5,723,832 A | * 3/1998 | Hall ...................... 200/43.19 |
| D408,018 S | * 4/1999 | McNaughton ............ D13/177 |
| 5,955,702 A | * 9/1999 | Grossman et al. ........... 174/66 |
| 6,184,482 B1 | * 2/2001 | Priem ..................... 200/43.16 |
| 6,462,278 B1 | * 10/2002 | Vrame ...................... 174/67 |

* cited by examiner

Primary Examiner—Dean A. Reichard
Assistant Examiner—Angel R. Estrada
(74) Attorney, Agent, or Firm—Kenneth J. Lukacher

(57) ABSTRACT

A device is provided for preventing accidental operation of a switch including a body having a surface with an opening and a cavity extending from the opening at an angle for receiving and releasably engaging the actuator member of a switch. With the switch in the desired on or off position, its actuator member is mounted into the cavity to engage the device, via the opening, such that the surface of the body lies adjacent the switch plate. Operation of the switch is prevented by the surface of the body providing a stop against the switch plate without physically anchoring the device to the switch plate.

24 Claims, 2 Drawing Sheets

DEVICE FOR PREVENTING SWITCH OPERATION

DESCRIPTION

1. Field of the Invention

The present invention relates to a device for preventing accidental operation of a switch, and particularly to, a device for preventing accidental operation of a switch, such as a toggle switch extending from a switch plate which does not require attachment to the switch plate.

2. Background of the Invention

Most switches in use today are secured in an outlet box in a wall or in a machine. In the front surface of the switch are threaded holes, which receive screws that fasten a switch plate to the switch, called hereinafter switch plate screws. These switch plate screws are inserted through holes in the switch plate. An opening or cutout is provided in the switch plate through which the actuator member of the toggle switch protrudes.

A problem arises with switches which control lights in areas where the lights must be kept on, or off, for periods of time, or which control other electrical devices, such as burglar alarms, in which the toggle switch can be accidentally operated by a person.

Devices for preventing switch operation have been developed using covers or open-sided members located over the actuator member of a switch and installed to a switch plate by clips or by one or more of the switch plate screws. Such devices are described, for example, in U.S. Pat. Nos. 4,102,471, 4,363,944, 4,506,120, and U.S. Design Patent Nos. D301,336, D301,872, D351,376, and D408,018.

Other devices provide an electrical switch protective cover, as described in U.S. Pat. No. 5,955,702, having a movable frame hingedly attached to a stationary frame mounted to a switch plate, where the stationary frame has an opening through which the actuator member of the switch extends into an enclosed cavity of the movable frame when closed against the stationary frame.

Other types of devices for preventing operation of a switch have a plate or arm member which lies against the actuator member of a switch to prevent its operation, and are also anchored to the switch plate by one or more of the switch plate screws, such as described, for example, in U.S. Pat. Nos. 4,876,425, 4,468,544, and 5,009,610, and U.S. Design Patent No. D372,224.

U.S. Pat. No. 5,324,897 shows a switch locking device having a one-piece locking body mounted by two screws to a switch plate with an opening receiving the switch to maintain the switch in a desired position. This patent also shows a mounted plate with a cutout to maintain the switch in a position. More complex locking devices mounted to a switch plate can be found in U.S. Pat. Nos. 5,260,528 and 5,543,593.

All of the above mentioned patents describe devices which require installation by attachment to a switch plate to anchor the device so as to either cover the actuator member, or lie against the actuator member of the switch. Such devices are often not useful with switch plate designs that lack screws or features onto which the device may attach. Further, installation to a switch plate using tools, such as a screw driver, increases the possible risk of electrical shock if the switch electrically shorts, such as through the switch plate screws, such due to improper installation or a damaged switch. This can results in a hazardous condition, especially where the device is of an electrically conductive material.

SUMMARY OF THE INVENTION

Accordingly, it is an object of the present invention to provide an improved device for preventing accidental operation of a switch that neither requires attachment to a switch plate, nor requires any tools to install on a switch.

It is further object of the present invention to provide an improved device for preventing accidental operation of a switch which maintains the switch in a desired position by mounting the device onto the actuator member of the switch, and to provide a stop against accidental operation of the switch using the surface of the switch plate.

Briefly described, the device embodying the invention has a body with a bottom surface having an opening, and a cavity extending from the opening at an angle with respect to the surface for receiving and releasibly engaging the actuator member of a switch. To mount the device onto a switch, the actuator member of the switch is mounted into the cavity, via the opening, such that the bottom surface of the body lies adjacent to the switch plate and thereby provides a stop against the switch plate to prevent accidental operation of the switch.

The device requires no physical attachment to a switch plate, and no tools are required to install or remove the device from a switch. Thus, the device is safer to install and use than prior art devices preventing switch operation.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 2:
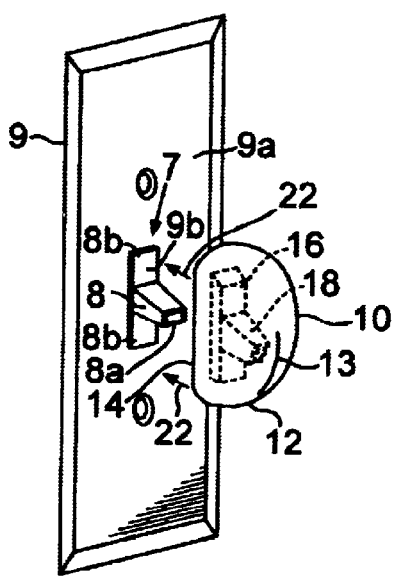
FIG. 2 is a view of the device of FIG. 1 being applied onto a switch to prevent operation of the switch.
Figure 3:
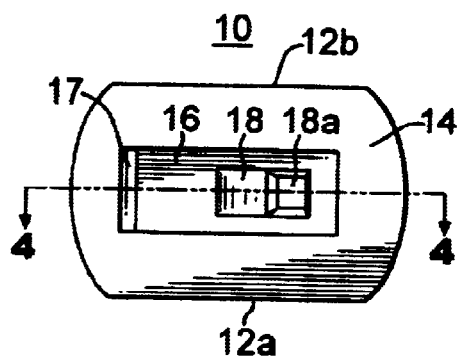
FIG. 3 is a bottom view of the device of FIG. 1.

Referring to the figures, a device 10 for preventing operation of a switch is shown having a body 12 with a bottom surface 14 having a generally rectangular shaped opening 16, and a cavity 18 extending from opening 16. The opening 16 and cavity 18 are shaped to receive the protruding portion 8 of a toggle switch 7 extending from an opening or aperture 9b in a switch plate 9, as shown in FIG. 2. Switch plate 9 represents an example of a typical switch plate. The protruding portion 8 of a switch typically includes an extending actuator member 8a movable to either an up (ON) position, where the member extends at an upward angle, or a down (OFF) position, where the member extends at a downward angle. Cavity 18 extends from opening 16 at an angle with respect to bottom surface 14 which approximately corresponds to the angle by which member 8a of a typical switch extends with respect to the surface 9a of switch plate 9, when in a down or up position. For example, the angle may be approximately 60 degrees from bottom surface 14 of body 12, as shown by angle 20 of FIG. 4. The actuator member 8a has a base 8b which may also partially extend through aperture 9b of the switch plate 9.

Figure 1:
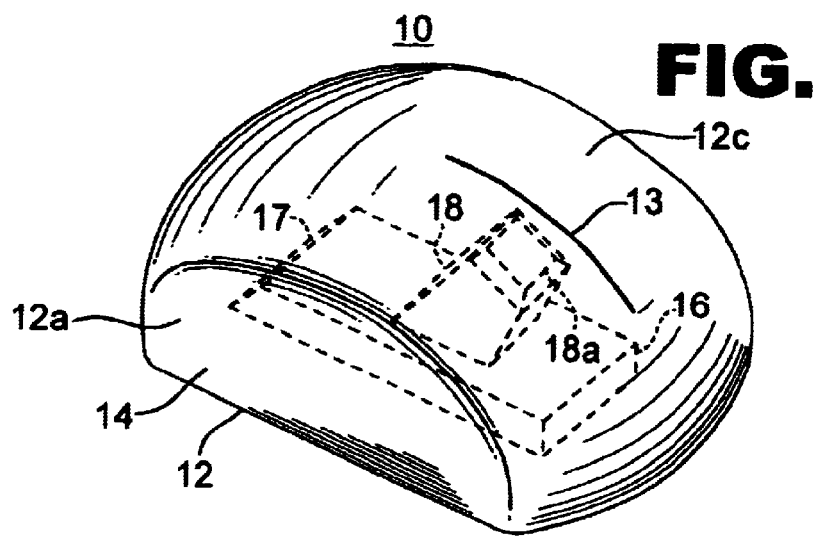
FIG. 1 is a perspective view of the device for preventing switch operation in accordance with the present invention in which dotted lines indicate surface of the device not viewable.
Figure 4:
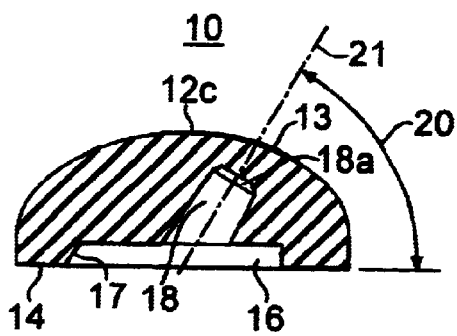
FIG. 4 is a cross-sectional view along lines A—A of FIG. 3.

The cavity 18 of body 12 is sized slightly smaller than the size of the actuator member 8a so that member 8a can frictionally engage (or grip) body 12 when device 10 is applied to switch 7, and enables release from the switch when the device 10 is removed from the switch. When actuator member 8a engages body 12 in cavity 18, the walls of opening 16 can receive part of the switch at the base 8b of the actuator member 8a when base 8b extends via switch plate aperture 9b. One or more walls 17 of opening 16 may be optionally chamfered at an angle, such as 30 degrees, as best shown in FIGS. 1 and 4. Cavity 18 has a closed end 18a which may be shaped with beveled sides to accommodate the shape of a typical end of actuator member 8a of switch 7.

The body 12 may be of any shape, but the body 12 of the preferred embodiment includes flat opposing sides 12a and 12b, flat bottom surface 14, a rounded top 12c, and rounded edges. where sides 12a and 12b meet top 12c. The body 12 may be molded from rubber or rubber-like materials, such as Texin or Santoprene, or other material having sufficient elasticity to enable the extending member 8a to deform the body 12 along sides of cavity 18 when located therein and thus frictionally engage (or grip) the body 12 in cavity 18 to retain actuator member 8a and be releasably engaging there from. The body 12 may thus be a single piece of material. For example, the opening 16 may be about 1.1 inches long, about 0.44 inches wide, and about 0.125 inches deep, and the cavity 18 extending about 0.42 inches from opening 16 along imaginary center line 21 (FIG. 4). Cavity 18 may slightly decrease in width from opening 16 to its end 18a. For example, the body 12 may be 0.7 inches in width at the apex of rounded top 12c, and 1.8 inches in length.

Figure 5:
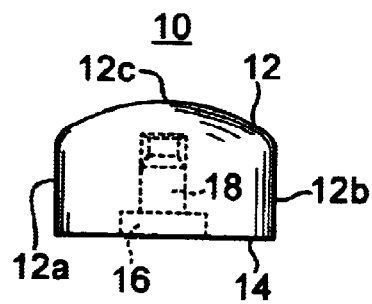
FIG. 5 is an end view of the device of FIG. 1.
Figure 6:
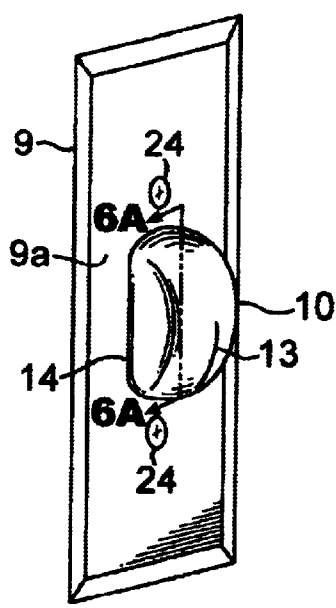
FIG. 6 is a view of the device of FIG. 1 as applied onto the switch of FIG. 2.
Figure 6A:
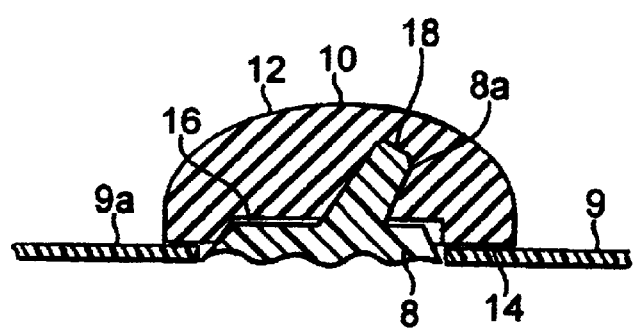
FIG. 6A is a cross-sectional view along lines 6A—6A of FIG. 6.

FIG. 2 shows the device being placed onto a switch 7 to locate actuator member 8a via opening 16 into cavity 18 by a person applying pressure upon body 12 sufficient in the direction shown by arrows 22 which forces actuator member 8a into an engaging relationship with cavity 18, such that the sides of cavity 18 grip (or snuggly fit) onto member 8a, until surface 14 of body 12 lies adjacent (or against) surface 9a of plate 9. FIGS. 6 and 6A show the device 10 once applied onto the switch 7 to prevent the switch from accidentally be turned to an up (on) position. Preferably, when device 10 is applied onto a switch 8, bottom surface 14 of body 12 is approximately parallel with the surface 9a of plate 9 facing surface 14 (e.g., body 12 may be flush mounted against plate 9 as shown in FIGS. 6 and 6A). In this manner, surface 14 of body 12 provides a stop against the plate surface 9a adjacent and facing surface 14 if a person tries to operate the switch by moving actuator member 8a. To remove device 10, a person pulls the device away from the switch in the direction opposite to that of arrows 22 to remove actuator member 8a from cavity 18. Thus, the device 10 releasably engages switch 7. Although the device is illustrated in FIGS. 2 and 5 as being used with a switch in a down position, the device 10 may be applied onto the switch with the actuator member 8a in an up position by reversing the device. An indicator, such as a ridge 13 indicates the orientation of device 10 (i.e., direction of angled cavity 18 with respect to surface 14), and the position of the switch 7 since the device 10 blocks view of the switch when applied thereto, as illustrated in FIG. 6. Other indicators may be used upon body 12, such as a printed line or label, or other symbol indicative of switch position.

Switch plate 9 illustrates an example of a wall-mounted switch plate for a wall switch, such as to a lamp, light, or other electrical device(s) connected to the outlet or in the electrical circuit controlled by the switch. The device 10 may be used with any switch plate (or other fixed surface) having an aperture through which the toggle portion 8 of the switch extends, or on switches of electrical machines or devices that may have a toggle switch with an actuator member similar to a typical wall mounted switch.

The device has the advantage over prior art devices by not requiring physical mounting or fastening onto a switch plate to anchor the device, such as by switch plate screws 24 (FIG. 6). No tools, such as a screw driver, or clips are needed to use device 10 or to remove device 10 from a switch. Thus, the device 10 may be easily removed for use on other switches without requiring detachment from the switch plate as in the prior art devices. The body 12 may also be compact and extend to the region about switch 7 between screws 24, as shown in FIG. 6, to provide a sufficient a stop at surface 14 against plate 9.

From the foregoing description, it will be apparent that there has been provided an improved device for preventing accidental operation of a switch. Variations and modifications in the herein described device in accordance with the invention will undoubtedly suggest themselves to those skilled in the art. Accordingly, the foregoing description should be taken as illustrative and not in a limiting sense.

What is claimed is:

1. A device for preventing accidental operation of a switch having an actuator member extending through an aperture of a plate, said device comprising a body having a surface, an opening from said surface, and a cavity extending from said opening at an angle for receiving and releasably engaging the actuator member of a switch via said opening by deforming said body in response to contact with said actuator member when said device is mounted upon said switch, in which said surface provides a stop against said plate to prevent accidental operation of said switch.

2. The device according to claim 1 wherein said device is not physically fastened to said plate when mounted upon said switch.

3. The device according to claim 2 wherein said actuator member of the switch extends at an angle when in one of an up position or down position, and said angle of said cavity approximately corresponds to the angle of said actuator member.

4. The device according to claim 3 wherein said angle of said cavity is approximately 60 degrees with respect to said surface.

5. The device according to claim 1 wherein said body is of a material suitably deforming to releasably engage said actuator member when located in said cavity of said body.

6. The device according to claim 1 wherein said body is made of rubber.

7. The device according to claim 1 wherein said body is composed of an electrical insulating material.

8. The device according to claim 1 wherein said surface represents a bottom surface, and said body further comprises two opposing sides, and a rounded top surface.

9. The device according to claim 1 wherein said surface is substantially parallel with said plate facing said surface when said device is applied to a switch.

10. The device according to claim 1 wherein said switch is in one of an up or down position when said body is mounted upon said switch via said opening into said cavity of said body.

11. The device according to claim 10 wherein said body further comprises an indicator of the position of said switch when said device is mounted onto said switch.

12. The device according to claim 1 wherein said plate has screws for mounting said plate to said switch, and said body extends within a region about said actuator member between said screws when said device is mounted upon the switch.

13. The device according to claim 1 wherein said body is of a single piece of material.

14. The device according to claim 1 wherein said device is mountable upon said actuator member of the switch when the switch is off and said same device is mountable upon said actuator member of the switch when the switch is on.

15. The device according to claim 1 wherein said body is mountable upon said actuator member regardless of the position of said switch.

16. A method for preventing accidental operation of a switch having an actuator member extending from an aperture of a plate comprising the steps of:

provizdng a body having an opening and a cavity extending from said opening for receiving and releasably engaging the actuator member of a switch via said opening by deforming said body in response to said actuator member being in said cavity; and mounting said actuator member in said cavity via said opening in which at least one surface of said body acts as a stop against said plate to prevent accidental operation of said switch.

17. The method according to claim 16 wherein said body is not fastened to said switch plate.

18. The method according to claim 16 wherein said cavity extends at an angle corresponding to an angle said actuator member extends from said plate when in one of an up or down position.

19. The method according to claim 16 wherein said mounting step is carried out regardless of the position of said switch.

20. A system for preventing accidental operation of a switch having an actuator member movable to at least two positions comprising:

means for releasably engaging the actuator member of a switch when in a first position or a second position; and means providing a stopping surface coupled to said engaging means which is capable of apposing a fixed surface adjacent said actuator member to stop said actuator member from moving from said first position to said second position or from said second position to said first position in which said stopping surface is in a non-attached relationship with said fixed surface, wherein said same releasably engaging means is operable to prevent operation of said switch regardless of said switch being in said first or second positions.

21. A device for preventing accidental operation of a switch having an actuator member, said device comprising a body having an opening and a cavity extending from said opening in which said body has material which is deformable to releasably engage said actuator member to enable said body to prevent operation of said switch.

22. The device according to claim 21 wherein said actuator member is positionable to at least two positions, and said device in a first orientation is mountable upon said actuator member in one of said positions and in a reverse orientation is mountable upon said actuator member in said second of said positions.

23. A device for preventing accidental operation of a switch having an actuator member extending through an aperture of a plate, said device comprising a body having a surface, an opening from said surface, and a cavity extending from said opening at an angle for receiving and releasably engaging the actuator member of a switch via said opening when said device is mounted upon said switch, in which said surface provides a stop against said plate to prevent accidental operation of said switch, wherein said actuator member has a base from which said actuator member extends, and said opening of said body is sized to receive a portion of said base when said portion of said base extends through said aperture of the plate.

24. The device according to claim 23 wherein said device is flush mountable upon said surface of the plate when said actuator member is received in said cavity through said opening.

* * * * *